United States Patent [19]

Shipman

[11] 4,072,661

[45] Feb. 7, 1978

[54] THIN-WALLED OVENABLE PARTS

[75] Inventor: Gene Herbert Shipman, Cottage Grove, Minn.

[73] Assignee: Minnesota Mining and Manufacturing Company, St. Paul, Minn.

[21] Appl. No.: 668,912

[22] Filed: Mar. 22, 1976

[51] Int. Cl.² ............................................. C08G 63/16
[52] U.S. Cl. .............................. 260/75 R; 260/2.5 N; 260/40 R; 260/45.85 S; 260/45.95 R; 260/75 T; 264/41; 264/309; 426/113
[58] Field of Search ................ 260/75 R, 75 M, 75 T, 260/45.85 S, 45.95 R, 40 R

[56] References Cited

U.S. PATENT DOCUMENTS

| | | | |
|---|---|---|---|
| 3,485,795 | 12/1969 | Gilles | 260/45.95 R |
| 3,487,044 | 12/1969 | Tholstrup | 260/45.85 S |
| 3,494,885 | 2/1970 | Thompson et al. | 260/45.85 S |
| 3,499,881 | 3/1970 | Poppe et al. | 260/45.85 S |
| 3,692,744 | 9/1972 | Rich | 260/75 T |
| 3,706,111 | 12/1972 | Curtin et al. | 260/75 R |
| 3,814,786 | 6/1974 | Gall et al. | 260/75 T |
| 3,928,279 | 12/1975 | Inata et al. | 260/40 R |

*Primary Examiner*—Lucille M. Phynes
*Attorney, Agent, or Firm*—Cruzan Alexander; Donald M. Sell; Donald C. Gipple

[57] ABSTRACT

Thin-walled ovenable parts made from polybutylene terephthalate.

3 Claims, No Drawings

THIN-WALLED OVENABLE PARTS

FIELD OF THE INVENTION

This invention relates to shaped thin-walled polymeric articles such as trays and containers of the type commonly used for the storage of food and other substances as well as for the serving of food.

BACKGROUND OF THE INVENTION

Shaped thin-walled trays and containers are in wide use, for example in the storage and service of food. They are ordinarily used once or only a few times before being discarded and thus must be inexpensive and easily manufactured. Three major types of such articles are in general use, i.e. those composed of relatively low melting thermoplastic materials (such as polyethylene, polypropylene, polystyrene, and polyvinyl chloride), of aluminum sheeting, and of thermoset resins (e.g., the melamines). Although all are widely used, each suffers from certain important deficiencies. Thus, the thermoplastic articles can be used over only limited temperature ranges (usually not higher than 100° C), the aluminum articles tend to have sharp edges and to dent easily, and cannot be used in microwave apparatus. The thermoset resins, especially the widely used melamines, have relatively poor impact strength, are brittle, tend to give off odors when heated and are rather expensive.

Except for the aluminum articles, they are commonly manufactured by injection molding processes which require relatively high capital outlays for the injection machinery and precision dies. Recently, a more economical process has been devised for the preparation of shaped thin-walled polymeric articles. It is an electrostatic powder spraying process (see, for example, U.S. Pat. Nos. 3,278,656, 3,369,274 and 3,482,013) which involves releasing electrostatically charged powdered polymeric material in the region of a heated shaped mold adapted to attract the powder. The area at the edge of the mold surface is of an insulating material which rejects the charged particles. Upon contacting the heated surface of the mold, the powder melts, flows into a continuous phase and solidifies when the mold cavity is subsequently cooled (all without the application of pressure). This process has proved to be quite successful in producing relatively satisfactory articles at very low costs.

The electrostatic spray process has, however, been used successfully only with polymeric materials which soften at relatively low temperatures such as polyethylene and polyvinyl chloride. Polymeric materials which are stable at higher temperature, such as polyethylene terephthalate, have not been used successfully in the electrostatic spray process. In fact it has not, insofar as is known, been possible heretofore to prepare ovenable articles utilizing this process.

THE PRESENT INVENTION

The present invention relates to shaped thin-walled ovenable articles of high quality which are precisely shaped (i.e. not subject to warping) and which have excellent properties of strength and durability throughout the temperature range of normal use (i.e. from liquid nitrogen freezer temperature through oven temperatures which can run up to about 200° C). These articles are prepared conveniently and inexpensively utilizing the electrostatic powder spraying process. Thus, by means of the present invention, low cost but high quality thin-walled, shaped, polymeric ovenable articles are made available for the first time. In addition to serving as containers for food during oven heating and baking they can also be used in various thermosterilization applications.

The shaped, thin-walled, ovenable articles of the invention are prepared by the electrostatic deposition of polybutylene terephthalate which has 1. a melt flow factor of about 20 grams per 10 minutes or greater,
2. a crystallization rate factor ($t_{50}$) of about 1–3 minutes,
3. a linear thermal contraction factor of 0.015–0.025 cm/cm,
4. a logarithmic viscosity number (inherent viscosity) greater than 0.6,
5. a heat deflection resistance factor of about 100°–200° C at 4.6 kg per square centimeter fiber stress,
6. a m.p. of 220°–230° C,
7. a glass transition temperature, ($T_g$) in the range of 20°–40° C.

The articles of the invention ordinarily do not have wall thicknesses exceeding about 1 mm (or 40 mils) and preferably not greater than about 0.63 mm (or 25 mils). They are shaped in that at least 10% and preferably at least 20 or 25% of the weight of the article is out of the major plane of the container (which is normally the top or bottom thereof). The articles may be trays having a generally flat interior or central portion and a raised enclosing edge portion to surround and restrain materials placed on the interior. The transition from the center to the raised portion may be a sharply defined right angle corner, but is preferably a smooth arcuate transition. In such containers the edge area is higher at every point than the central area, and there are no seams or welds on the edge. In the formation of trays, particular design features such as raised partitions in the central portion of the tray or container may be formed as desired by selecting an appropriate mold. The articles can be heated in hot air, steam, autoclave, infrared, or microwave ovens because of their ability to retain dimensional stability at high temperatures.

In the electrostatic powder spraying process the powder (containing polybutylene terephthalate alone or together with certain additives as discussed hereinafter) flows into a continuous shaped molten body upon contacting the heated mold. As the mold is cooled, the polymer crystallizes rapidly, contracts slightly and pops off of the mold. The rapid crystallization is essential to reach practical production speeds. The crystallization rate factor ($t_5$) of 1–3 minutes specified herein provides an objective relative measure of the crystallization rate but is not indicative of actual production rates, which are ordinarily considerably less than one minute. The finished article is strong and high resistant to warping and softening, even at oven temperatures, and is not brittle even at freezer temperatures.

The unique characteristics of the articles of the present invention, as well as the advantages in manufacture mentioned previously are due to the polybutylene terephthalate therein. Therefore the articles most preferably contain at least 99 percent of polybutylene terephthalate, although various additives may be included in the powder charge to render them more suitable for particular end uses or processing situations. (The percentage figures throughout this specification refer to weight percentages in the entire article unless otherwise specifically noted.) Heavy loadings of inert fillers (such as talc, titania, clay, wood flour, calcium carbonate, silica, glass microbeads and glass fibers) are sometimes included, for example to reduce raw material costs, to improve strength and/or high temperature resistance, etc. Up to about 60 percent of filler may be included, although ordinarily 30-40 percent filler is preferred.

Also, up to about 20 percent (preferably not more than 10 percent) of polymeric toughening additives (such as polyethylene and polypropylene) can be included. Small amounts of some of the filler materials (such as titania and talc) can be used as pigments and/or nucleating agents and plasticizer/lubricants (such as silicone oils) and antioxidant/stabilizers may also be added. The sum of all of these minor additives (pigments, nucleating agents, plasticizer/lubricants and antioxidant/stabilizers) is ordinarily not more than about one percent. Finally, if foamed articles are to be prepared, blowing agents can be added. Ordinarily these are used in amounts ranging from about 0.1 to 0.5 percent, although in the case of polymeric blowing agents up to about 3 percent may be present.

Among the suitable stabilizers and/or antioxidants are sterically hindered polyphenols (of the type available from Ciba-Geigy under the trade designations "Irganox"-1010, -1093 and -1098), dilauryl thiodipropionate, distearyl thiodipropionate, p-nitrophenyl hydroquinone-5,5'-bitoluhydroquinone, gentishydrazide, gentisanilide, ethylene bisstearamide, hexane bislauramide, etc. Nitrogen-releasing blowing agents such as those available from the Polychemicals Division of Stephan Chemical Co. under the trade designations "Expandex OX-5PT" (a triazine) and "Kempore" (an azodicarbonamide) and carbondioxide-releasing blowing agents such as polycarbonate resins are suitable.

The various physical properties referred to herein are carried out utilizing the following procedures:

The melt flow factor. ASTM-1238 run at 250° C at a load of 2160 grams.

The crystallization factor, $t_{50}$, (a measure of the elapsed time between cooling a molten polymer sample to a temperature 20° C below its melting point and the crystallization of the polymer). A melting and boiling point apparatus fitted with a microscope hot stage and modified photocell units is used (available from Mettler Instrumente, A.G. of Zurich, Switzerland under model designations FP-2 and FP-21). A sample of a film of the polymer to be tested (about 0.25-0.5 cm thick) is placed in the photocell unit. A light beam is shown through the sample and the intensity of the transmitted light is displayed by means of a strip chart recorder. The intensity of the transmitted light is first noted at 10° C above the melting point of the polymer and the sample is then cooled rapidly to 20° C below the melting temperature. Crystallization causes a marked reduction in the intensity of the transmitted light. The time elapsed between cooling the sample and a 50 percent reduction of the transmitted light is the $t_{50}$ value.

The linear thermal contraction factor, ASTM D-955.

The logarithmic viscosity number (inherent viscosity), ASTM D-2857.

The heat deflection resistance factor, ASTM D-648.

Melting point, ASTM D-2117.

Glass transition temperature, determined by means of DTA (differential thermal analysis) as described in the Journal of Polymer Science, Part A-1, Volume 4, page 1853 (1966).

The following non-limiting examples illustrate the practice of the invention. All parts are by weight unless otherwise specified.

EXAMPLE 1

Preparation of Polybutylene Terephthalate 1360 parts of dimethyl terephthalate and 820 parts of 1-4 butandiol are mixed at atmospheric pressure together with 0.68 part of tetraisopropyl titanate catalyst. Also included are 1.36 part of a sterically hindered polyphenol ("Irganox"-1010) and 1.36 part of dilauryl thiodipropionate. The mixture is heated in a reaction vessel to 200° C at atmospheric pressure. The first distillate of methanol occurs at a batch temperature of 139° C and the reaction is continued until 97% of the methanol produced in the condensation reaction has been removed. The pressure is then reduced and the temperature is raised to 250° C. The polymerization under vacuum is continued until a logarithmic viscosity number of at least 0.6 has been reached.

The resulting polymer has a melt flow factor of about 20 grams per 10 minutes or greater, a crystallization rate factor ($t_{50}$) of about 1-3 minutes, a linear thermal contraction factor of 0.015-0.025 cms/cm, a heat deflection resistance factor of about 100°-200° C at 4.6 kg per square centimeter fiber stress, a m.p. of 220°-230° C and a glass transition temperature, ($T_g$) in the range of 20°-40° C.

The product is removed from the reaction vessel while still molten, solidifies upon cooling and is ground to a powder (particles smaller than about 0.3 mm).

EXAMPLE 2

Preparation and Use of an Article According to the Invention

A polybutylene terephthalate powder prepared as described in Example 1 and conforming to the physical properties set out therein is sprayed onto the surface of a suitable heated mold using an electrostatic spray gun. The powder fuses and forms a clear melt on the mold. As the mold cools the polymer becomes solid, turns opaque (crystallizes) and pops free of the mold as a shaped food container about 4 cm deep and 15 cm across. It is filled with a food product consisting essentially of a tomato sauce containing pieces of beef and macaroni and is cooked in an oven at slightly above 200° C for 20 minutes. The tray is then emptied and is found to be unwarped and otherwise undamaged.

What is claimed is:

1. A shaped, thin-walled, ovenable article prepared by the electrostatic deposition of a composition containing, in addition to optionally present inert filler, not less than 80 percent by weight of polybutylene terephthalate and effective amounts of both a stabilizer and an antioxidant, the sum of the amounts of stabilizer and antioxidant therein being not more than about one percent by weight, said composition having
   1. a melt flow factor of about 20 grams per 10 minutes or greater,
   2. a crystallization rate factor ($t_{50}$) of about 1-3 minutes,
   3. a linear thermal contraction factor of 0.015-0.025 cm/cm,
   4. a logarithmic viscosity number greater than 0.6,
   5. a heat deflection resistance factor of about 100°-200° C at 4.6 kg per square centimeter fiber stress, 6. a m.p. of 220°–230° C and
7. a glass transition temperature ($T_g$) in the range of 20°–40° C.

2. A shaped, thin-walled, ovenable article prepared by the electrostatic deposition of a composition containing, in addition to optionally present inert filler, not less than 80 percent by weight of polybutylene terephthalate and effective amounts of both a stabilizer and an antioxidant, the sum of the amounts of the stabilizer and the antioxidant therein being from about 0.1 to 0.5 percent by weight, said composition having 1. a melt flow factor of about 20 grams per 10 minutes or greater,
2. a crystallization rate factor ($t_{50}$) of about 1–3 minutes,
3. a linear thermal contraction factor of 0.015–0.025 cm/cm,
4. a logarithmic viscosity number greater than 0.6,
5. a heat deflection resistance factor of about 100°–200° C at 4.6 kg per square centimeter fiber stress,
6. a m.p. of 220°–230° C and
7. a glass transition temperature ($T_g$) in the range of 20°–40° C.

3. An article according to claim 2 containing not less than about 99 percent by weight of polybutylene terephthalate.

* * * * *